US012664799B2

(12) United States Patent
Lim et al.

(10) Patent No.: US 12,664,799 B2
(45) Date of Patent: Jun. 23, 2026

(54) AUTOMATICALLY CAPTIONING IMAGES USING SWIPE GESTURES AS INPUTS

(71) Applicant: MOTOROLA SOLUTIONS, INC., Chicago, IL (US)

(72) Inventors: Bing Qin Lim, Bayan Lepas (MY); Cecilia Liaw, Bayan Lepas (MY); Ming Yeh Koh, Bayan Lepas (MY); Moh Lim Sim, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 375 days.

(21) Appl. No.: 18/360,330

(22) Filed: Jul. 27, 2023

(65) Prior Publication Data

US 2025/0037490 A1      Jan. 30, 2025

(51) Int. Cl.
    *G06V 20/70*          (2022.01)
    *G06F 3/04883*        (2022.01)
    *G06F 3/14*           (2006.01)
(52) U.S. Cl.
    CPC .......... *G06V 20/70* (2022.01); *G06F 3/04883* (2013.01); *G06F 3/14* (2013.01); *G06V 2201/07* (2022.01)
(58) Field of Classification Search
    CPC ........ G06V 20/70; G06F 3/04883; G06F 3/14
    USPC ....................................................... 382/190
    See application file for complete search history.

(56) References Cited

U.S. PATENT DOCUMENTS

| | | | | | |
|---|---|---|---|---|---|
| 12,293,776 | B2* | 5/2025 | Lim | ......................... | G10L 17/00 |
| 2010/0169766 | A1* | 7/2010 | Duarte | ................ | G06F 3/04883 |
| | | | | | 715/702 |
| 2014/0325407 | A1* | 10/2014 | Morris | ................ | G06F 3/04842 |
| | | | | | 715/765 |
| 2018/0176474 | A1* | 6/2018 | Blanco | .................... | G06T 11/60 |
| 2019/0034406 | A1* | 1/2019 | Singh | .................... | G06F 40/274 |
| 2021/0248725 | A1* | 8/2021 | Kang | .................. | G06F 3/04847 |
| 2022/0382968 | A1* | 12/2022 | Lim | ......................... | G06T 11/60 |

OTHER PUBLICATIONS

Bhikadiya, "Automatic Image Captioning Using Deep Learning," <https://medium.com/swlh/automatic-image-captioning-using-deep-learning-5e899c127387> article dated Oct. 4, 2020, 19 pages.
(Continued)

*Primary Examiner* — William D Titcomb
(74) *Attorney, Agent, or Firm* — Michael Best & Friedrich LLP

(57)                ABSTRACT

Devices, systems, and methods for automatically captioning images using swipe gestures as inputs. One example apparatus includes an electronic processor. The electronic processor is configured to receive an image. The electronic processor is configured to control a display to display the image. The electronic processor is configured to detect a first object in the image. The electronic processor is configured to detect a second object in the image. The electronic processor is configured to receive, from the display, a first swipe gesture. The electronic processor is configured to, responsive to receiving the first swipe gesture, determine a direction of the first swipe gesture relative to the first object and the second object. The electronic processor is configured to determine a word choice based on the first direction. The electronic processor is configured to generate a caption describing the image based on the word choice.

16 Claims, 13 Drawing Sheets

400

(56)                    References Cited

OTHER PUBLICATIONS

Cagrandi et al., "Learning to Select: A Fully Attentive Approach for Novel Object Captioning," Proceedings of the 2021 International Conference on Multimedia Retrieval, 2021, 5 pages.

Chen et al., "Leveraging Human Attention in Novel Object Caption," Proceedings of the Thirtieth International Joint Conference on Artificial Intelligence, 2021, pp. 622-628.

Google Language Team, "Google's Conceptual Captions," <https://ai.google.com/research/ConceptualCaptions/> web page visited Jul. 24, 2023, 2 pages.

Liu et al., "O2NA: An Object-Oriented Non-Autoregressive Approach for Controllable Video Captioning," Findings of the Association for Computational Linguistics, 2021, pp. 281-292.

Park et al., "Attend to You: Personalized Image Captioning with Context Sequence Memory Networks," Proceedings of the IEEE Conference on Computer Vision and Pattern Recognition, 2017, 9 pages.

Predić et al., "Automatic Image Caption Generation Based on Some Machine Learning Algorithms," Mathematical Problems in Engineering, 2022, 11 pages.

Sammani et al., "Show, Edit and Tell: A Framework for Editing Image Captions," Proceedings of the IEEE/CVF Conference on Computer Vision and Pattern Recognition, 2020, pp. 4808-4816.

Zheng et al., "Intention Oriented Image Captions with Guiding Objects," Proceedings of the IEEE/CVF Conference on Computer Vision and Pattern Recognition, 2019, pp. 8395-8404.

* cited by examiner

400

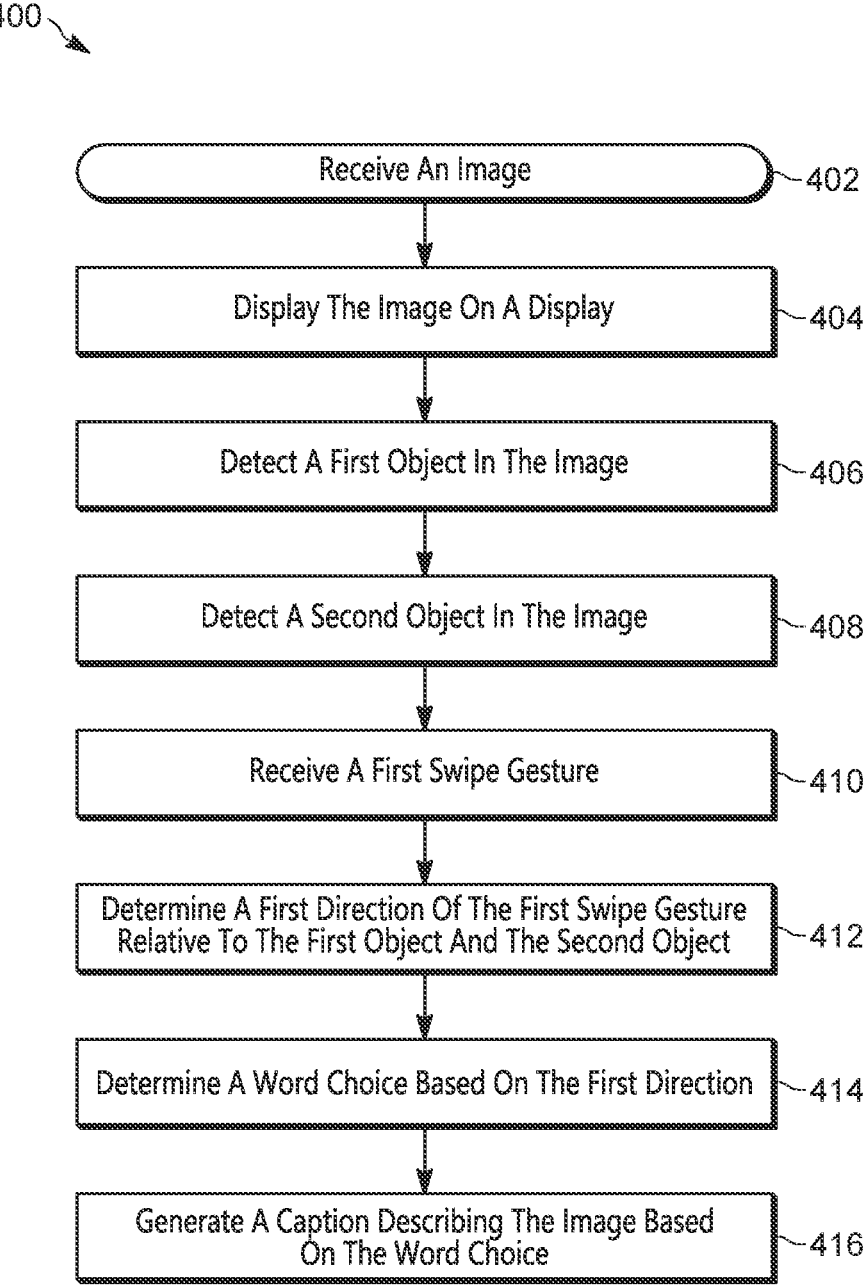

Receive An Image ~402

Display The Image On A Display ~404

Detect A First Object In The Image ~406

Detect A Second Object In The Image ~408

Receive A First Swipe Gesture ~410

Determine A First Direction Of The First Swipe Gesture Relative To The First Object And The Second Object ~412

Determine A Word Choice Based On The First Direction ~414

Generate A Caption Describing The Image Based On The Word Choice ~416

FIG. 4

AUTOMATICALLY CAPTIONING IMAGES USING SWIPE GESTURES AS INPUTS

BACKGROUND OF THE INVENTION

Public safety personnel must spend time both responding to an incident (e.g., a crime scene, a traffic accident, and the like) and documenting the incident response (e.g., for later use as evidence in criminal trials or other official investigations or proceedings). Documentation includes images and written reports. To reduce the time spent on report writing, automated tools are used to prepare portions of the report.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

FIG. 4 is a flowchart illustrating a method for automatically captioning images according to some examples.

Figure 1:
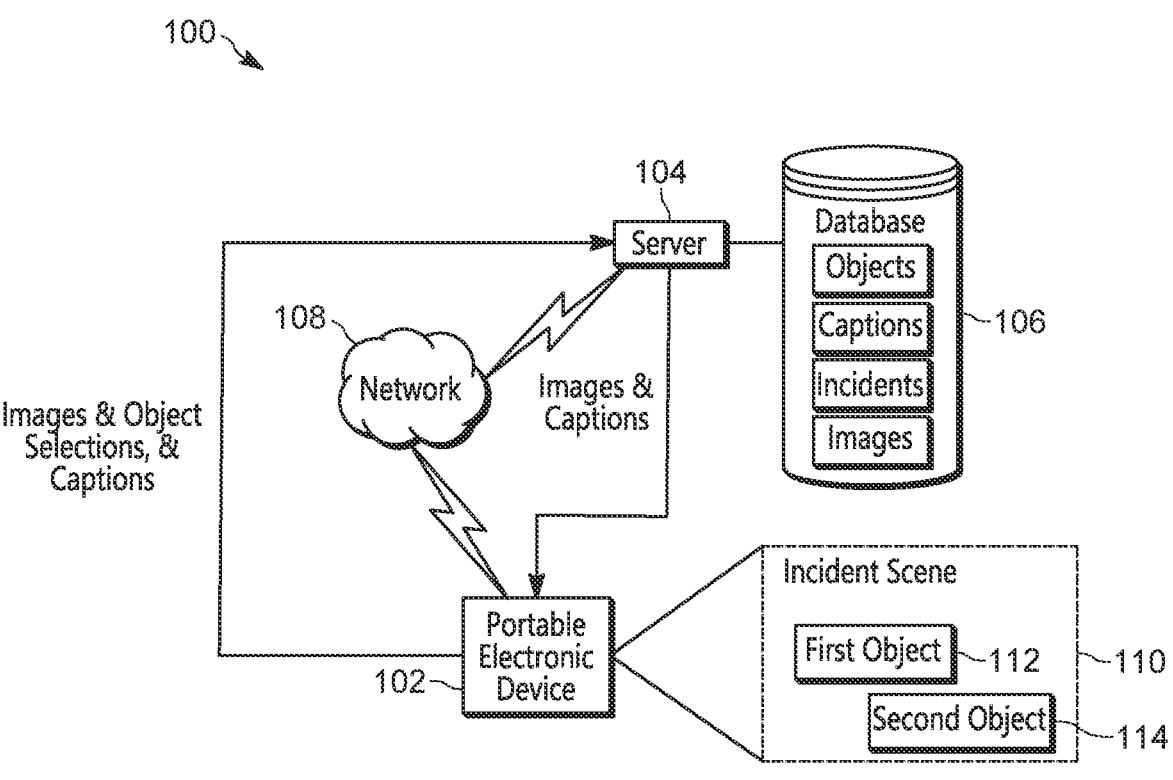
FIG. 1 illustrates a system for automatically captioning images according to some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to the understanding of various embodiments, examples, aspects, and features so as not to obscure the disclosure with details that will be readily apparent to those of ordinary skill in the art having the benefit of the description herein.

DETAILED DESCRIPTION OF THE INVENTION

Documenting public safety responses (e.g., by writing reports), while necessary, is a time consuming process that reduces availability for higher value tasks. Accordingly, automated tools are provided that aid public safety personnel in report writing. For example, images of an incident scene may be collected by responders, submitted by witnesses, or otherwise acquired and attached to incident reports. One automated tool provided to public safety personnel is a caption generation engine, which uses video analytics, natural language processing, machine learning, and the like to automatically generate a caption describing an image. These automatic captions can save valuable time during documentation.

Images taken of an incident scene often record only the results of an incident and may lead to incomplete or inaccurate captions being generated. For example, an image of two vehicles that have collided may not offer clues as to the sequence of events or direction of vehicle movement prior to the capture of the image.

To address, among other things, these problems, systems and methods are provided herein for automatically captioning images using swipe gestures as inputs.

Using the examples and aspects presented herein, a public safety officer can apply swipe gestures to a captured image to provide context to the caption generation engine, resulting in more accurate and complete captions for images. This improves the functioning of the caption generation engine, leading to more efficient use of computing resources.

One example provides an apparatus including an electronic processor. The electronic processor is configured to receive an image. The electronic processor is configured to control a display to display the image. The electronic processor is configured to detect a first object in the image. The electronic processor is configured to detect a second object in the image. The electronic processor is configured to receive, from the display, a first swipe gesture. The electronic processor is configured to, responsive to receiving the first swipe gesture, determine a first direction of the first swipe gesture relative to the first object and the second object. The electronic processor is configured to determine a word choice based on the first direction. The electronic processor is configured to generate a caption describing the image based on the word choice.

Another example embodiment provides a method for automatically captioning images using swipe gestures as inputs. The method includes receiving an image. The method includes displaying the image on a display. The method includes detecting a first object in the image. The method includes detecting a second object in the image. The method includes receiving a first swipe gesture. The method includes, responsive to receiving the first swipe gesture, determining a first direction of the first swipe gesture relative to the first object and the second object. The method includes determining a word choice based on the first direction. The method includes generating, with an electronic processor, a caption describing the image based on the word choice.

For ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

It should be understood that although certain figures presented herein illustrate hardware and software located within particular devices, these depictions are for illustrative purposes only. In some instances, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 is a block diagram of a system 100 for capturing and processing images. In particular, the system 100 is configured to automatically caption images using swipe gestures as inputs. In the example illustrated, the system 100 includes a portable electronic device 102, a server 104, a database 106, and a network 108. The portable electronic device 102 and the server 104 are communicatively coupled via the network 108. The network 108 is a communications network including wireless and/or wired connections. The network 108 may be implemented using a land mobile radio (LMR) network, a cellular network (for example, a Long Term Evolution (LTE) network), combinations or derivatives thereof, and other suitable networks, including future-developed network architectures. In some embodiments, communications with other external devices (not shown) occur over the network 108.

Figure 2:
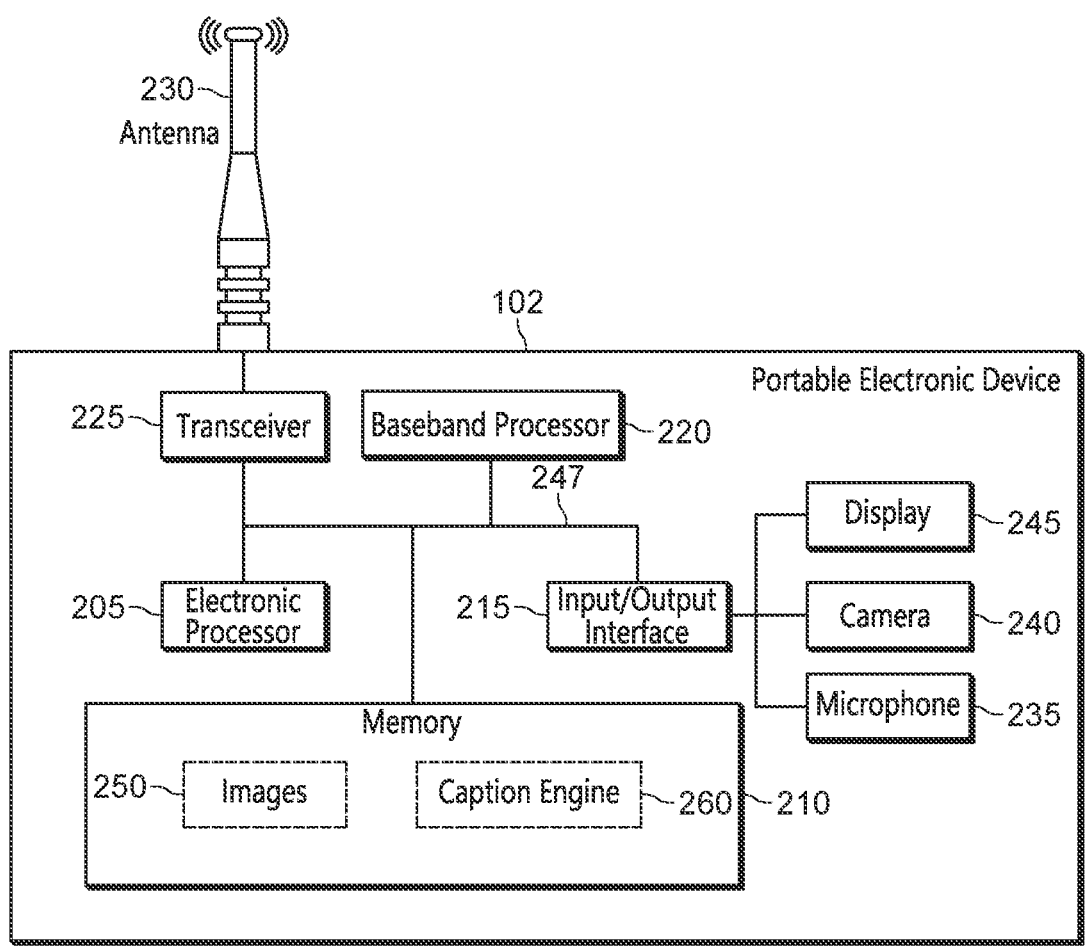
FIG. 2 is a block diagram of a portable electronic device of the system of FIG. 1 according to some examples.

The portable electronic device 102, described more particularly below with respect to FIG. 2, is a wireless communication device that includes hardware and software that enable it to communicate via the network 108. In some aspects, the portable electronic device 102 includes a camera and is capable of capturing, storing, analyzing, displaying, and transmitting captured images (for example, images of an incident scene 110, images of the first object 112 and/or the second object 114, and the like).

In some aspects, the portable electronic device 102 may be used by public safety personnel while responding to an incident or investigating an incident scene. In the illustrated example, the incident scene 110 is the scene of an incident, to which public safety personnel may respond (for example, the scene of a traffic accident or a crime scene). The incident scene 110 may be located indoors or outdoors. As part of the response, public safety and other personnel may capture images of objects at the incident scene (for example, the first object 112 and the second object 114). Such objects may be objects of interest to the incident. An object of interest may be any object present at the incident scene, which object is related to the incident (for example, involved in or relevant to an investigation of the incident). Objects of interest may include, for example, automobiles (for example, in the case of a traffic accident) and weapons (for example, in the case of a crime scene). Objects of interest may also be tangible things not commonly thought of as objects, but which are still removable or transitory in nature (for example, fluids leaked from automobiles, debris from damaged property, blood stains, broken glass, skid marks, and fingerprints). In some embodiments, a person (for example, a crime or accident victim, persons gathered at the scene, and the like) may also be an object of interest. An incident scene may include many objects and objects of interest.

As part of an incident response or a subsequent visit to the incident scene (for example, to perform additional investigation or evidence gathering), responding personnel may capture images or view previously captured images of the incident scene 110, the first object 112, the second object 114, and the like. In some aspects, previously captured images may be provided to the portable electronic device 102 by the server 104. Images may be captured to document the incident scene 110 for inclusion in, for example, an incident report. In some aspects, the portable electronic device 102 operates using, among other things, augmented reality technology, where live images are captured and displayed (for example, on a screen) with text, graphics, or graphical user interface elements superimposed on or otherwise combined with the live images. The superimposed text or graphics may be used to record or convey information about the incident scene 110, the first object 112, the second object 114, or both.

As described herein, the system 100 is configured to automatically generate captions for the images, i.e., one or more sentences describing the image in plain language. In some aspects, live images or previously-captured images are interacted with by an operator of the portable electronic device 102 (for example, via a graphical user interface). As described herein, such interactions include object selections, which are used to generate the captions. As illustrated in FIG. 1, the captions may be generated by the portable electronic device 102, the server 104, or both.

Figure 3:
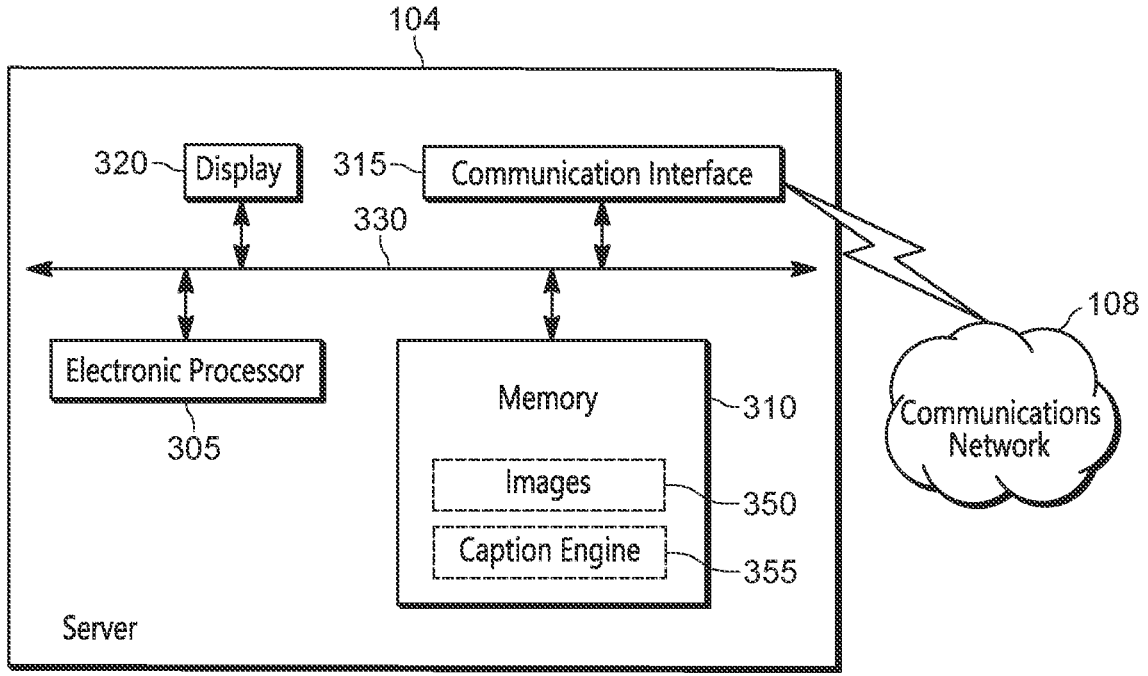
FIG. 3 is a block diagram of a computer server of the system of FIG. 1 according to some examples.

The server 104 is described more particularly with respect to FIG. 3. The server 104 is configured to perform the methods described herein. The server 104 reads and writes data to and from the database 106. As illustrated in FIG. 1, the database 106 may be a database housed on a suitable database server communicatively coupled to and accessible by the server 104. In some aspects, the database 106 may be part of a cloud-based database system external to the system 100 and accessible by the server 104 and the portable electronic device 102 over one or more additional networks. In some embodiments, all or part of the database 106 may be locally stored on the server 104. In some embodiments, as described herein, the database 106 electronically stores data corresponding to objects (for example, the first object 112 and the second object 114), incidents (for example, as part of or in communication with a Computer Aided Dispatch (CAD) system), images captured (for example, including the first object 112, the second object 114, or both), and captions describing the images. In some embodiments, the server 104 and the database 106 are part of a CAD system.

FIG. 2 is a diagram of an example of the portable electronic device 102. In the embodiment illustrated, the portable electronic device 102 includes an electronic processor 205, a memory 210, an input/output interface 215, a baseband processor 220, a transceiver 225, an antenna 230, a microphone 235, a camera 240, and a display 245. The illustrated components, along with other various modules and components (not shown) are coupled to each other by or through one or more control or data buses (for example, a communication bus 247) that enable communication therebetween.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, images 250 (for example, as captured by the camera 240) and a caption generation engine 260.

The caption generation engine 260 generates a caption for an image. In some aspects, a caption is one or more sentences describing an image (for example, "An automobile accident involving a blue sedan and a white pickup truck."). In some aspects, the caption generation engine 260 operates or includes a video analytics engine (for example, stored in the memory 210). A video analytics engine performs video and image analytics by analyzing images (for example, images captured by the camera 240) to, among other things, detect and identify objects within the images, for example, by implementing one or more object classifiers (for example, a Haar feature-based cascade classifier). In some embodiments, the caption generation engine 260 performs machine learning functions. Machine learning generally refers to the ability of a computer program to learn without being explicitly programmed. In some embodiments, a computer program (e.g., a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data and progressively refine algorithms for data analytics. In some embodiments, the caption generation engine 260 is trained using images and incident reports (including captions for the images) from a public safety database (for example, a CAD system). In some aspects, the caption generation engine 260 also includes, or is configured to execute, a natural language processing (NLP) engine, which can analyze voice communications related to the incident to extract keywords relevant to the image.

The input/output interface 215 is configured to receive input and to provide system output. The input/output interface 215 obtains information and signals from, and provides information and signals to, (for example, over one or more wired and/or wireless connections) devices both internal and external to the portable electronic device 102.

The electronic processor 205 is configured to control the baseband processor 220 and the transceiver 225 to transmit and receive images, data, and voice communications to and from the portable electronic device 102. The baseband processor 220 encodes and decodes digital data sent and received by the transceiver 225. The transceiver 225 transmits and receives radio signals to and from various wireless communications networks (for example, the network 108) using the antenna 230. The electronic processor 205, the baseband processor 220, and the transceiver 225 may include various digital and analog components, which for brevity are not described herein and which may be implemented in hardware, software, or a combination of both. Some embodiments include separate transmitting and receiving components, for example, a transmitter and a receiver, instead of a combined transceiver 225.

The microphone 235 is capable of sensing sound, converting the sound to electrical signals, and transmitting the electrical signals to the electronic processor 205 via the input/output interface 215. The electronic processor 205 processes the electrical signals received from the microphone 235 to, for example, produce an audio stream. In some aspects, the caption generation engine 260 converts speech received from the microphone 235 into text for use in generating a caption.

The camera 240 is an image capture device for capturing images and video streams, including a portion of or the entire incident scene 110, by, for example, sensing light in at least the visible spectrum. The camera 240 communicates the captured images and video streams to the electronic processor 205 via the input/output interface 215. It should be noted that the terms "image" and "images," as used herein, may refer to one or more digital images captured by the camera 240, or processed by the electronic processor 205, or displayed on the display 245. Further, the terms "image" and "images," as used herein, may refer to still images or sequences of images (that is, a video stream). As illustrated, the camera 240 is integrated into the portable electronic device 102. In alternative embodiments, the camera 240 is separate from the portable electronic device 102, and communicates captured images to the portable electronic device 102 via a wired or wireless connection. For example, the camera 240 may be integrated into a body-worn camera or a vehicle's dash or roof mount camera, which communicates with the portable electronic device 102.

The display 245 is a suitable display such as, for example, a liquid crystal display (LCD) touch screen, or an organic light-emitting diode (OLED) touch screen. The portable electronic device 102 implements a graphical user interface (GUI) (for example, generated by the electronic processor 205, from instructions and data stored in the memory 210, and presented on the display 245), that enables a user to interact with the portable electronic device 102. In some embodiments, the portable electronic device 102 operates or is integrated with a head-mounted display (HMD) or an optical head-mounted display (OHMD). In some embodiments, the portable electronic device 102 operates or is integrated with a LCD touch screen console display or heads up display (HUD) in a vehicle. In some aspects the display 245 is remote to and controlled by the portable electronic device 102.

As described in detail below, the portable electronic device 102 is capable of receiving and processing images captured by the camera 240, and displaying processed images in a graphical user interface on the display 245. Computerized image capturing and processing techniques are known, and will not be described in detail.

In some embodiments, the portable electronic device 102 is a smart telephone. In other embodiments, the portable electronic device 102 may be a tablet computer, a vehicle's dash console, a smart watch, a portable radio, or another portable or mobile electronic device containing software and hardware enabling it to operate as described herein.

FIG. 3 illustrates an example of the server 104. In the example provided, the server 104 includes an electronic processor 305, a memory 310, a communication interface 315, and a display 320. The illustrated components, along with other various modules and components (not shown) are coupled to each other by or through one or more control or data buses (for example, a communication bus 330) that enable communication therebetween.

The electronic processor 305 obtains and provides information (for example, from the memory 310 and/or the communication interface 315) and processes the information by executing one or more software instructions or modules, capable of being stored, for example, in a random access memory ("RAM") area of the memory 310 or a read only memory ("ROM") of the memory 310 or another non-transitory computer readable medium (not shown). The software can include firmware, one or more applications, program data, filters, rules, one or more program modules, and other executable instructions. The electronic processor 305 is configured to retrieve from the memory 310 and execute, among other things, software to carry out the methods described herein.

The memory 310 can include a program storage area and a data storage area. The program storage area and the data storage area can include combinations of different types of memory, as described herein. In the embodiment illustrated, the memory 210 stores, among other things, images 350 and a caption generation engine 355, as described herein.

The communication interface 315 is an electronic communication interface configured to receive input and to provide system output. The communication interface 315 obtains information and signals from, and provides information and signals to, (for example, over one or more wired and/or wireless connections) devices both internal and external to the server 104. The communication interface 315 may include a wireless transmitter or transceiver for wirelessly communicating over the communications network 108. Alternatively, or in addition to a wireless transmitter or transceiver, the communication interface 315 may include a port for receiving a cable, such as an Ethernet cable, for communicating over the communications network 108 or a dedicated wired connection. It should be understood that, in some embodiments, the server 104 communicates with other devices through one or more intermediary devices, such as routers, gateways, relays, and the like.

The display 320 is a suitable electronic display. In some embodiments, the server 104 implements a graphical user interface (GUI) (for example, generated by the electronic processor 305, from instructions and data stored in the memory 310, and presented on the display 320), that enables a user to interact with the server 104. In some embodiments, the server 104 enables display remotely, for example, using a display (configured similarly to the display 320) of the portable electronic device 102 or another suitable device in communication with the server 104 (for example, a dispatch console).

FIG. 4 illustrates an example method 400 for generating captions for images using swipe gestures as inputs. Although the method 400 is described in conjunction with the system 100 as described herein, the method 400 could be used with other systems and devices. In addition, the method 400 may be modified or performed differently than the specific example provided.

As an example, the method 400 is described as being performed by the portable electronic device 102 and, in particular, by the electronic processor 205. However, it should be understood that, in some embodiments, portions of the method 400 may be performed by other devices, including for example, the server 104.

At block 402, the electronic processor 205 receives an image. For example, the electronic processor 205 may receive an image captured by the camera 240 of the portable electronic device 102. In another example, the electronic processor 205 may receive an image from the server 104 or in response to a query to a CAD system (e.g., using an incident identifier to request images associated with an incident). In one example, illustrated in FIG. 5A, the electronic processor 205 receives the image 500.

At block 404, the electronic processor 205 controls a display to display the image. For example, the electronic processor 205 may display the image on the display 245 (e.g., using a software application). In another example, the electronic processor 205 may cause a display in communication with the portable electronic device 102 to display the image.

Figure 5A:
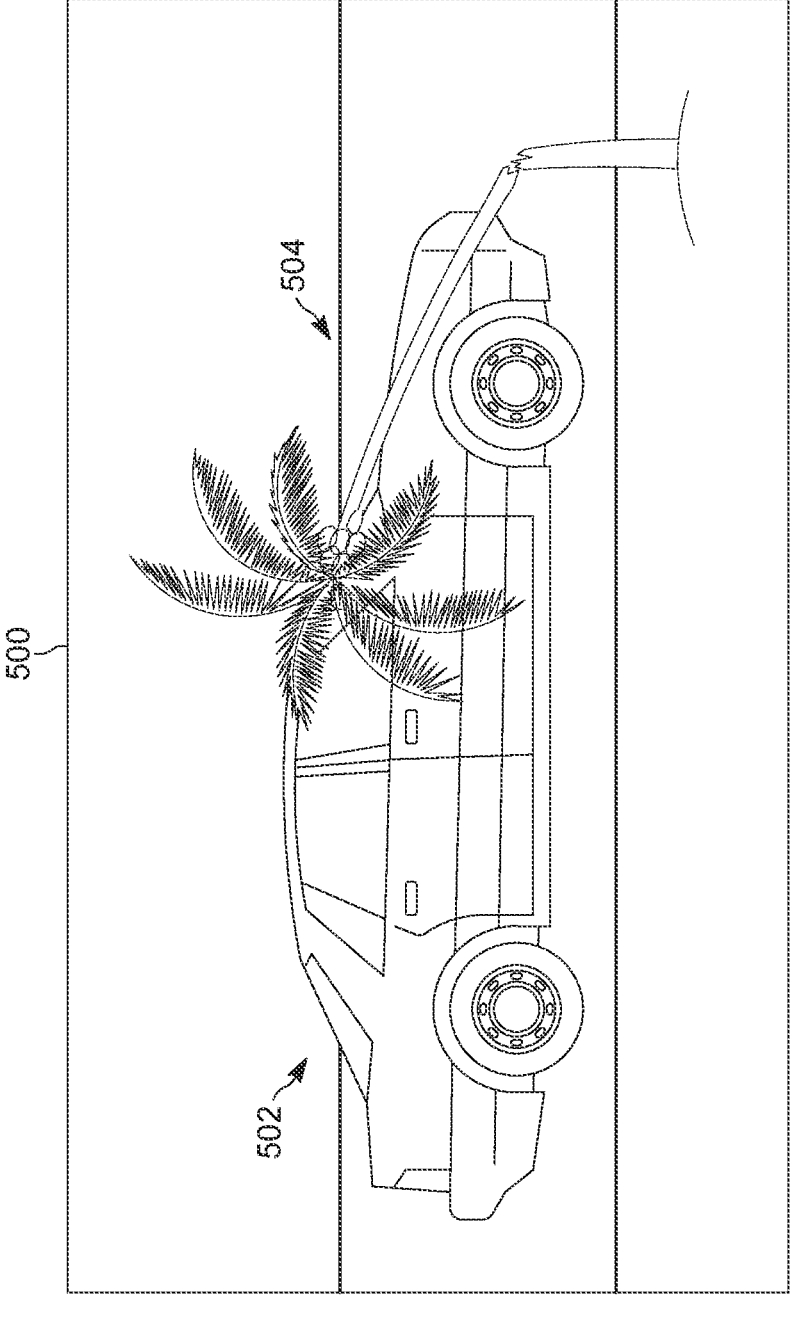
FIGS. 5A-5C illustrate aspects of the execution of the method of FIG. 4 according to some examples.
Figure 5B:
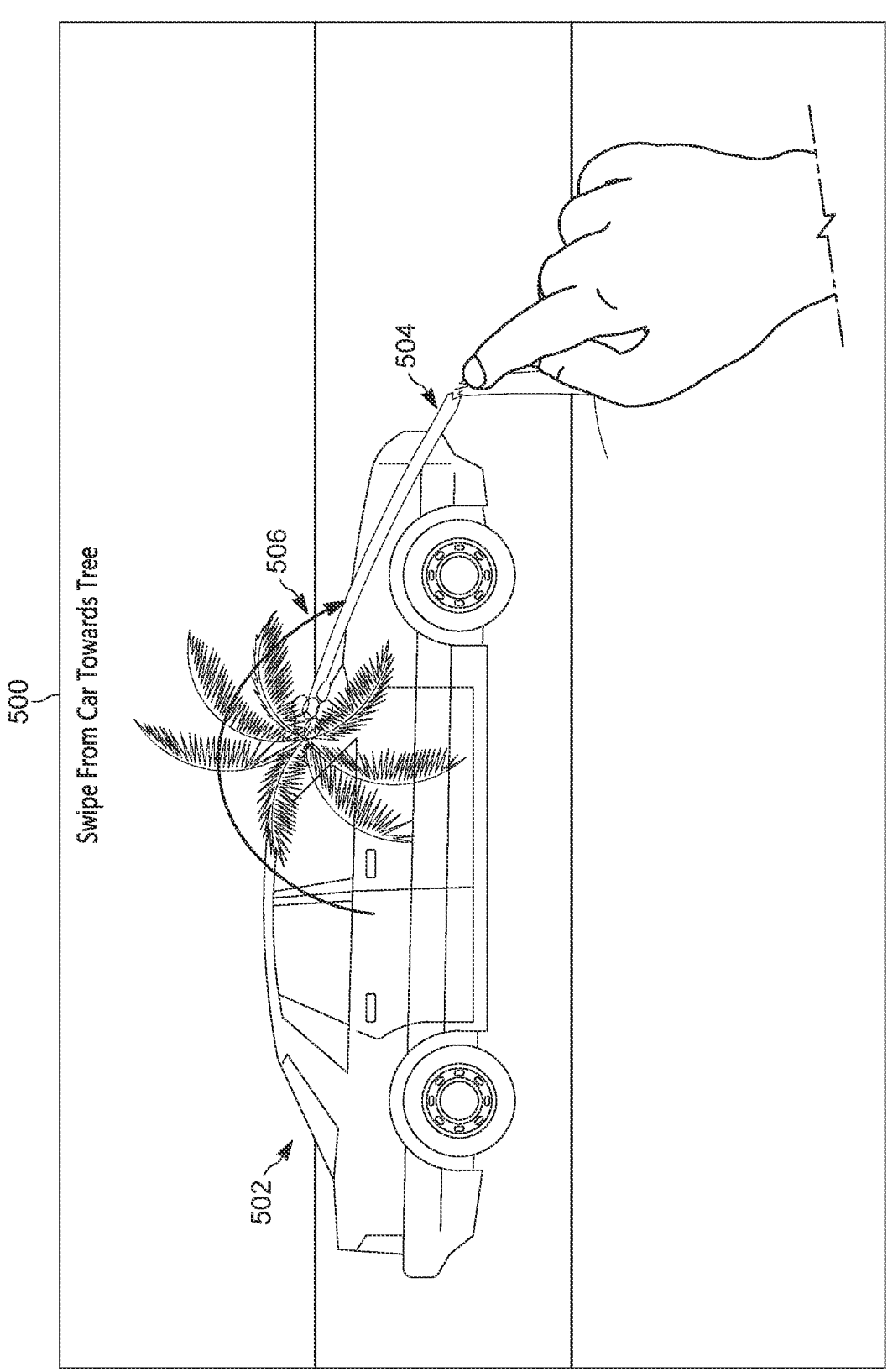

At block 406, the electronic processor 205 detects a first object in the image. For example, the electronic processor 205 may execute an object classifier to detect and identify objects in the image. For example, as illustrated in FIG. 5B, the electronic processor 205 may detect and identify the car 502 as the first object.

At block 408, the electronic processor 205 detects a second object in the image. For example, the electronic processor 205 may execute an object classifier to detect and identify objects in the image. For example, as illustrated in FIG. 5B, the electronic processor 205 may detect and identify the tree 504 as the second object.

At block 410, the electronic processor 205 receives, from the display, a first swipe gesture. For example, the electronic processor 205 may receive a swipe gesture 506 (illustrated in FIG. 5B) or a swipe gesture 508 (illustrated in FIG. 5C) from a touch screen display displaying the image 500 (e.g., the display 245).

Figure 5C:
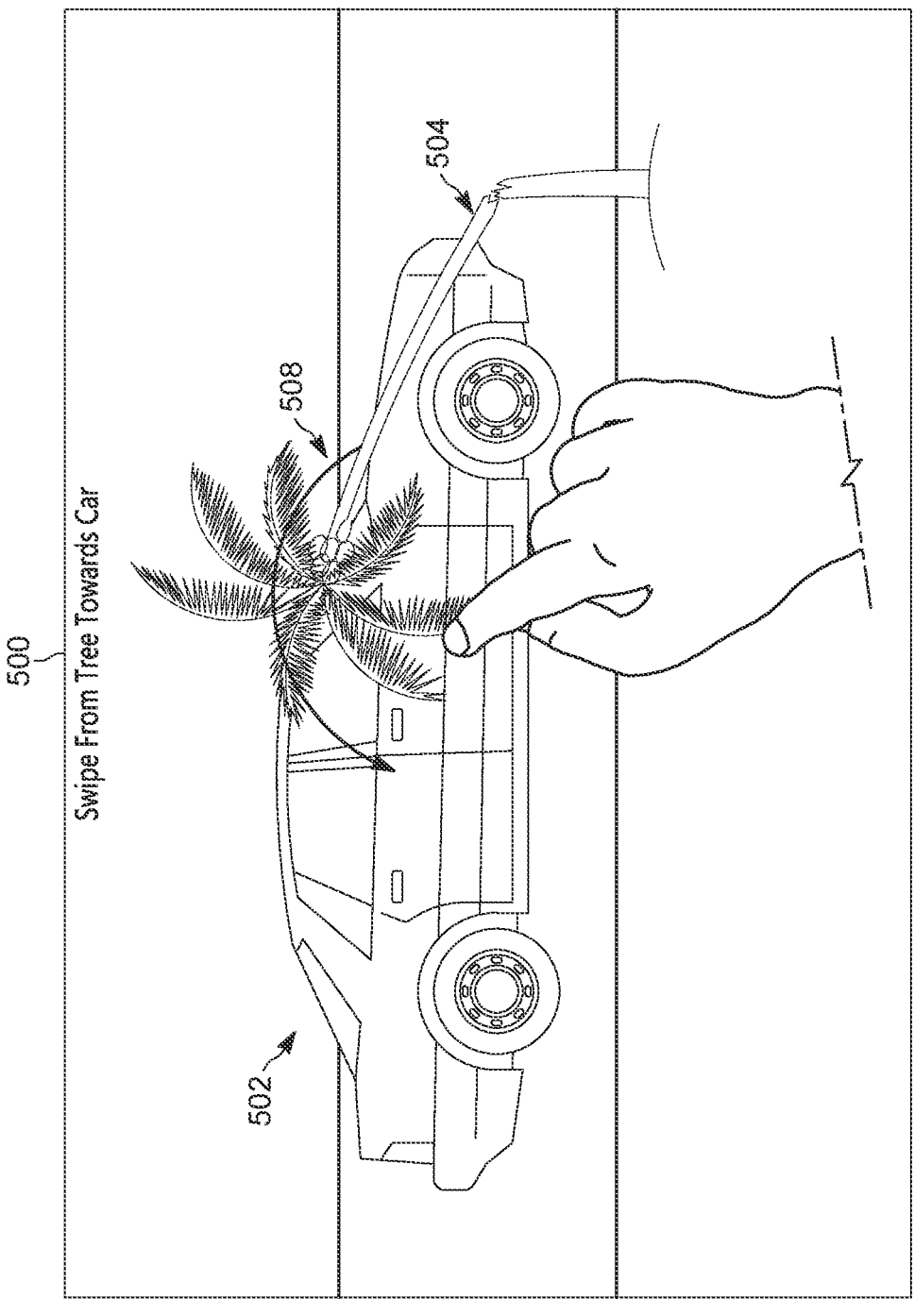

At block 412, the electronic processor 205 responsive to receiving the first swipe gesture, determines a direction of the first swipe gesture relative to the first object and the second object. For example, the electronic processor 205 may determine a starting point and an end point for the swipe gesture 506. In one example, as illustrated in FIG. 5B, the electronic processor 205 would determine the direction of the swipe gesture 506 is from the first object (the car 502) towards the second object (the tree 504). In another example, as illustrated in FIG. 5C, the electronic processor 205 would determine the direction of the swipe gesture 508 is from the second object (the tree 504) towards the first object (the car 502). In some aspects, the direction of the swipe gesture indicates with which of the detected objects in the image the swipe gesture was in contact and in what order.

At block 414, the electronic processor 205 determines a word choice based on the first direction. In some aspects, determining word choice includes assigning the detected objects to the role of subject and predicate in a sentence to be generated by the caption generation engine. For example, as noted above, the direction of the first swipe gesture may indicate the order in which the first object and the second object were selected (contacted) by the first swipe gesture. In some aspects, the electronic processor 205 interprets the direction of the swipe gesture as indicating a cause and effect order between the objects selected by the swipe gesture. The electronic processor 205 uses the order in which the first object and the second object were selected by the first swipe gesture to determine which of the first object and the second object should be identified as the subject of the caption, and which of the first object and the second object should be identified as the predicate of the caption. In some aspects, the word choice also includes the names and applicable descriptions of the objects assigned to the subject and predicate roles. For example, the word choice may indicate, among other things, that the subject is a red sedan and the predicate is a white cargo truck, For example, as illustrated in FIG. 5B, where the direction of the swipe gesture 506 indicates that the car 502 was selected before the tree 504, the car 502 is identified as the subject and the tree 504 is identified as the predicate. In another example, as illustrated in FIG. 5C, where the direction of the swipe gesture 508 indicates that the tree 504 was selected before the car 502, the tree 504 is identified as the subject and the car 502 is identified as the predicate.

In some aspects, in addition to identifying a subject and a predicate, the word choice includes a linking verb (e.g., as in a typical English-language sentence having syntax of: subject, linking verb, and predicate) that indicates which of the first object and the second object acted upon the other and how one of the first object and the second object acted upon the other. For example, as illustrated in FIGS. 5A-5C, the word choice may also include the indication that either the car or tree struck the other object, as the two objects are in contact with each other.

At block 416, the electronic processor 205 generates a caption describing the image based on the word choice. For example, the electronic processor 205 provides the word choice (determined at block 414) to the caption generation engine, which generates a sentence describing the caption based on the word choice. For example, where the car 502 is identified as the subject and the tree 504 is identified as the predicate, the caption generation engine may generate the caption "a car knocked over a tree" for the image 500. In another example, where the tree 504 is identified as the subject and the car 502 is identified as the predicate, the caption generation engine may generate the caption "a tree fell onto a car" for the image 500.

Figure 6A:
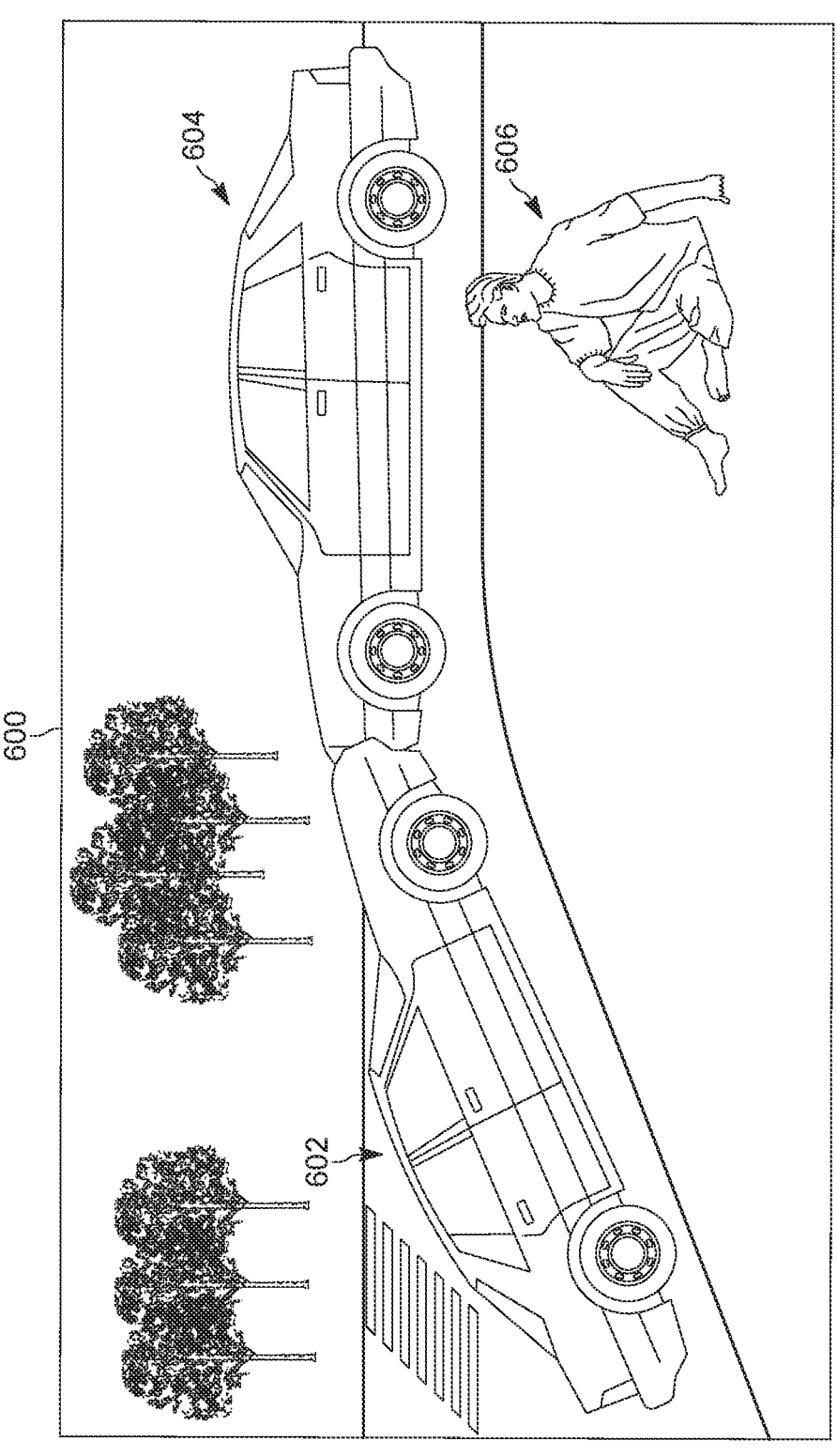
FIGS. 6A-6C illustrate aspects of the execution of the method of FIG. 4 according to some examples.
Figure 6B:
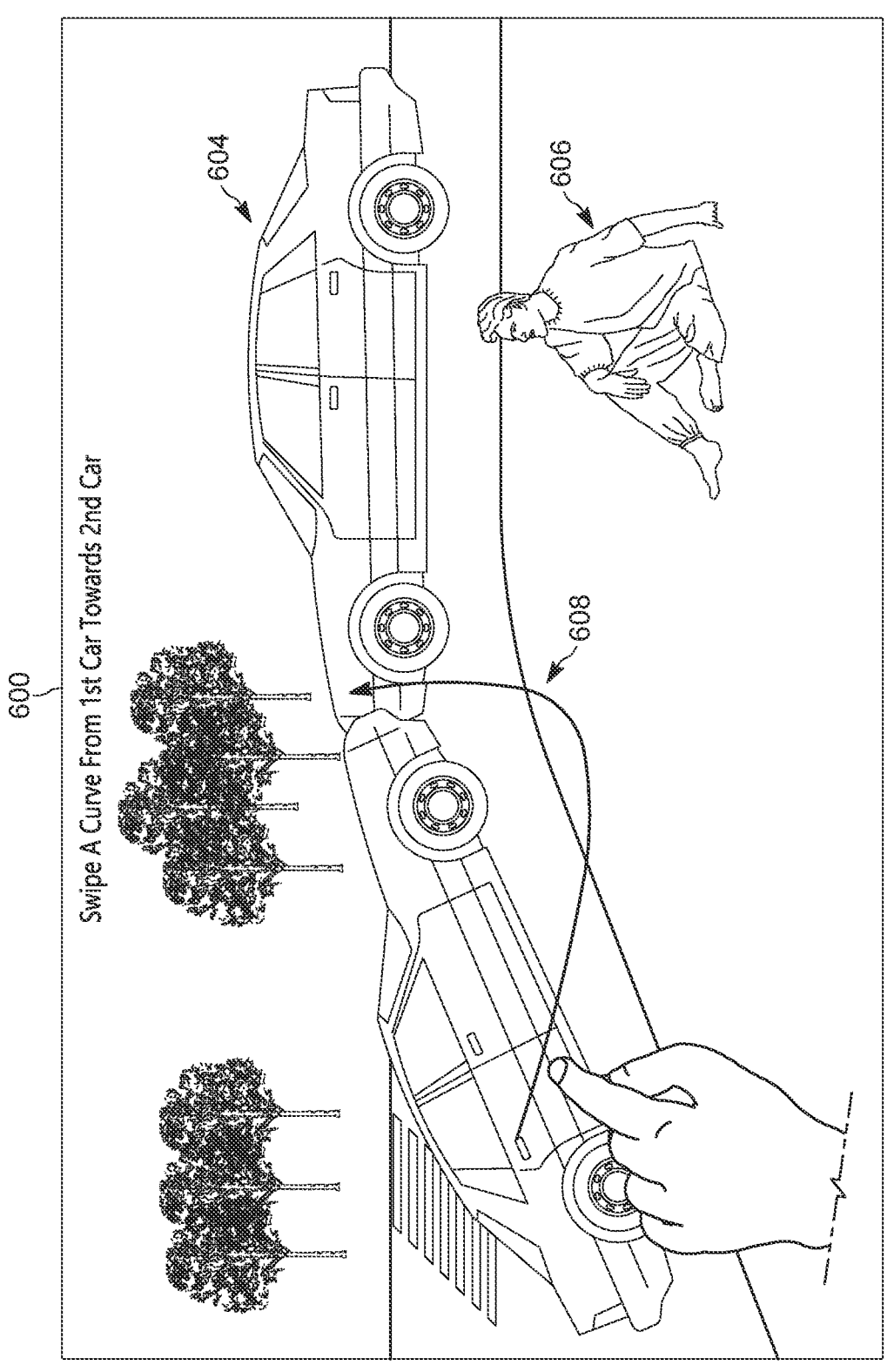
Figure 6C:
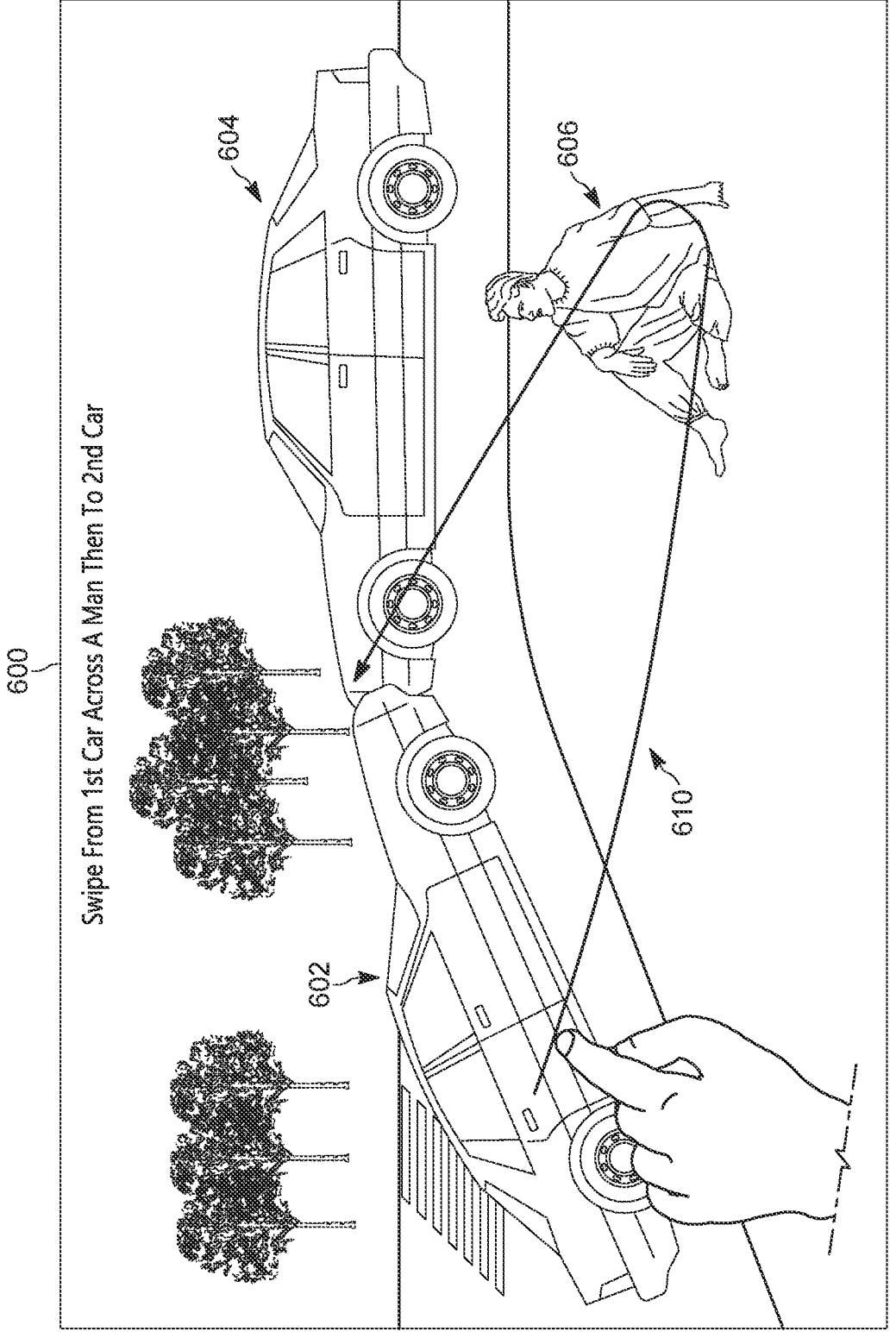

In some aspects, the direction of the swipe gesture may indicate a relationship between the objects, depending on whether the gesture is made to, through, or around the objects. For example, as illustrated in FIGS. 6A-6C, three objects are involved. In FIG. 6A, image 600 is illustrated with three detected objects, a first car 602, a second car 604, and a man 606.

As illustrated in FIG. 6B, the swipe gesture 608 begins on the first car 602 and ends on the second car 604 but does not include the man 606. In this example, the word choice may assign the first car 602 as the subject, the second car 604 as the predicate, and may indicate an action of the first car 602 upon the second car 604. Based on this word choice, the caption generation engine may generate a caption of "the first car collided with the second car" for the image 600. In some aspects, the word choice may also indicate a lack of acting upon an object—the man 606. Based on such a word choice, the caption generation engine may generate a caption of "the first car steered left to avoid the man and collided with the second car" for the image 600.

As illustrated in FIG. 6C, the swipe gesture 610 begins on the first car 602 and ends on the second car 604 and sweeps across the man 606. In this example, the word choice may assign the first car 602 as the subject, the second car 604 and the man 606 as predicates and may indicate an action of the first car 602 upon the man 606 and the second car 604. Based on this word choice, the caption generation engine may generate a caption of "the first car collided with a man and then steered left, colliding with the second car" for the image 600.

In some aspects, the electronic processor 205 may detect the first object and the second object by performing object recognition to recognize particular objects based on an incident type or a Computer Aided Dispatch (CAD) identifier. For example, if the image is assigned to an incident type of automobile accident, the electronic processor 205 may select an object classifier tuned to detect automobiles, traffic signals, and the like. In another example, where an incident record is already opened, objects related to the incident may have already been identified, making it easier to detect them in subsequent images.

In some examples, the electronic processor 205 can retrieve an incident report based on the CAD identifier and generate an initial caption for the image based on a content of the incident report. For example, if the incident report indicates that an automobile accident occurred, the caption generation engine may generate an initial caption for image 600 stating "a first vehicle collided with a second vehicle." Upon processing the image according to the method 400, the electronic processor 205 may replace the initial caption with the caption generated based on the swipe inputs, as described above.

Figure 7A:
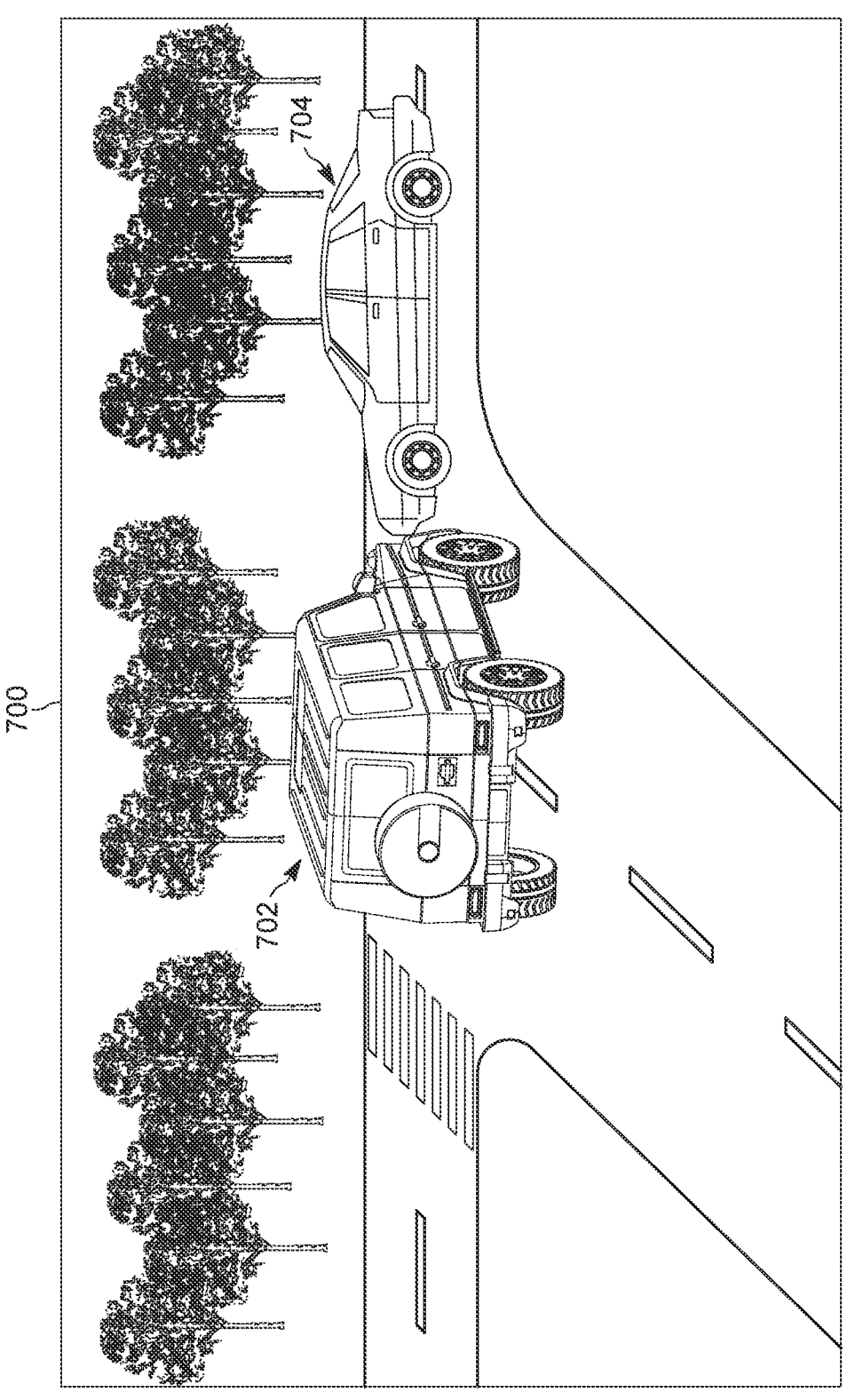
FIGS. 7A-7C illustrate aspects of the execution of the method of FIG. 4 according to some examples.
Figure 7B:
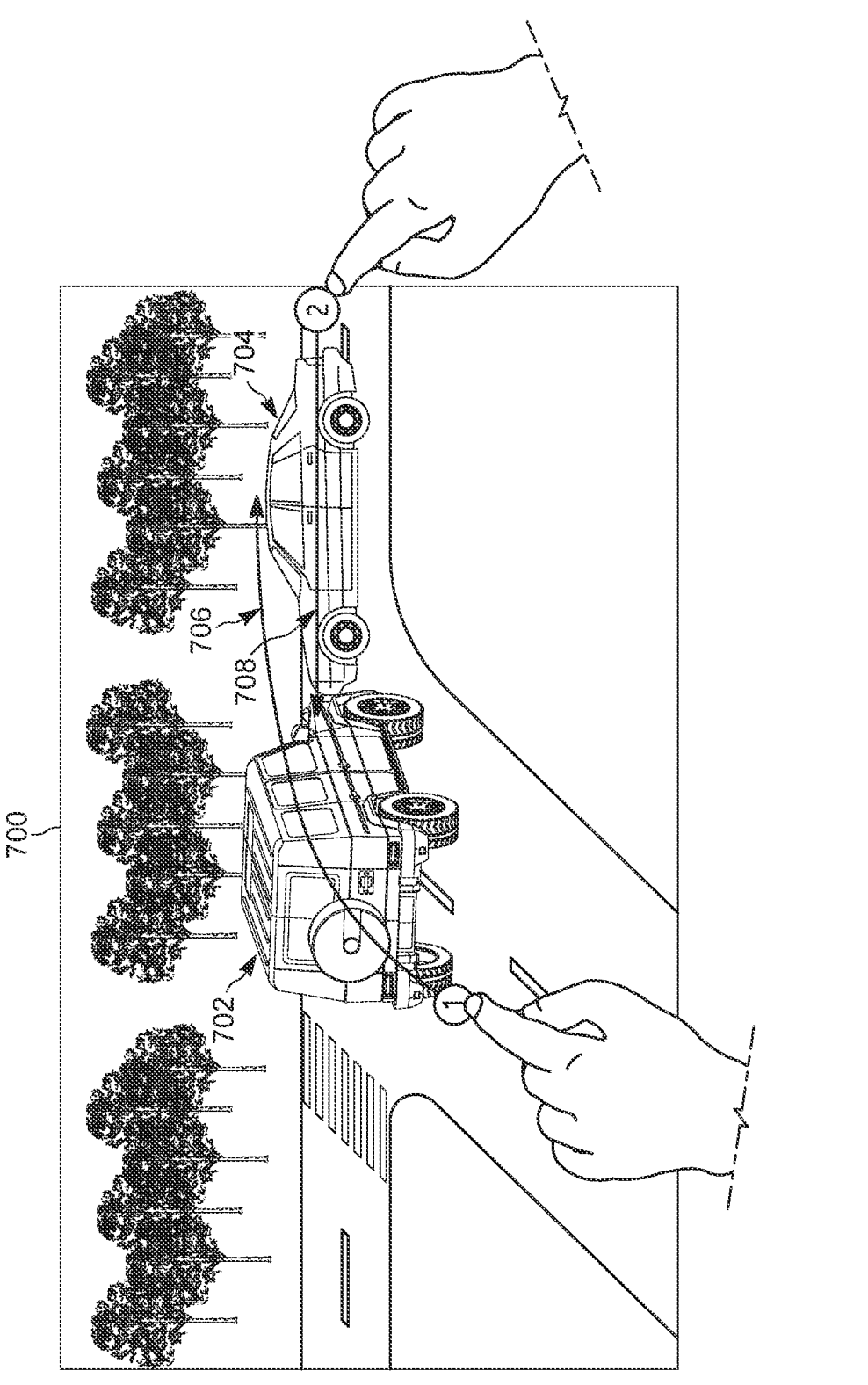
Figure 7C:
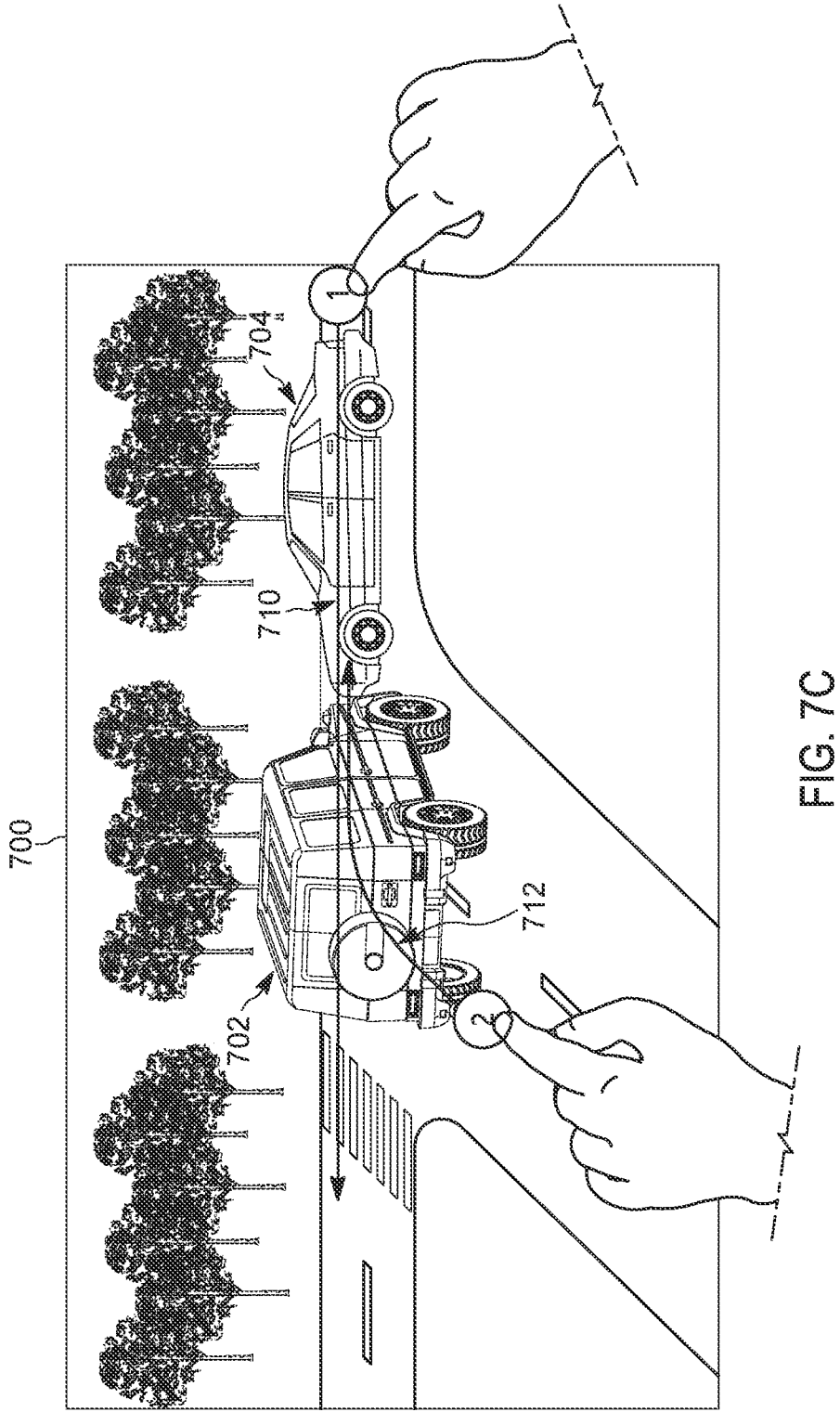

In some aspects, more than one swipe gesture may be used to provide context to the caption generation engine. An example of this is illustrated in FIGS. 7A-7C. In FIG. 7A, an image 700 is illustrated, with two objects having been detected: an SUV 702 and a sedan 704. As illustrated in FIG. 7B, the electronic processor 205 receives a first swipe gesture 706 and a second swipe gesture 708. The electronic processor 205 determines a first direction for the first swipe gesture 706 and a second direction for the second swipe gesture 708, as described above. The electronic processor 205 then determines the word choice based on the first direction and the second direction.

For example, the electronic processor 205 may determine an event sequence for the image based on the first swipe gesture and the second swipe gesture and generate the caption for the image based on the event sequence. The event sequence indicates which of the first object and the second object performed a first action, and which of the first object and the second object performed a second action.

In one example, illustrated in FIG. 7B, the direction of the first swipe gesture 706 (beginning on the SUV 702 and going around the sedan 704) indicates that the SUV 702 was moving in a right turn and the direction of the second swipe gesture 708 (beginning on the sedan 704 and ending on the SUV 702) indicates that the sedan 704 acted upon the SUV 702. Using this information, the caption generation engine may generate the caption "while the SUV was turning right, a sedan collided with it" for the image 700.

In another example, illustrated in FIG. 7C, the direction of the first swipe gesture 710 (beginning on the sedan 704 and passing through the SUV 702) indicates that the sedan 704 was travelling straight and the direction of the second swipe gesture 712 (beginning on the SUV 702 and ending on the sedan 704) indicates that the SUV 702 acted upon the sedan 704. Using this information, the caption generation engine may generate the caption "while the sedan was travelling straight, the SUV made a right turn and collided with the sedan" for the image 700.

In some aspects, the electronic processor 205 may determine or refine the word choice for the event sequence based on information about the incident (e.g., the content of an incident report received from a CAD system). For example, the electronic processor 205 may detect the first object and the second object by performing object recognition to recognize particular objects based on an incident type or a Computer Aided Dispatch (CAD) identifier, as described above. The electronic processor 205 may retrieve an incident report based on the CAD identifier, as described above, and assign one of the first object and the second object to a subject and assign the other of the first object and the second object to a predicate based on the first direction and the second direction determined for first and second swipe gestures, as described above. In some aspects, the electronic processor 205 may determine a linking verb relating the subject to the predicate based on a content of the incident report. For example, if the incident report is related to a traffic accident, the electronic processor 205 may choose verbs such as "collide," "swerve," "accelerate," and the like.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An apparatus comprising:
an electronic processor configured to:
receive an image;
control a display to display the image;
detect a first object in the image;
detect a second object in the image;
receive, from the display, a first swipe gesture;
responsive to receiving the first swipe gesture, determine a first direction of the first swipe gesture relative to the first object and the second object;
determine a word choice based on the first direction; and
generate a caption describing the image based on the word choice;
wherein:
the first direction of the first swipe gesture indicates an order in which the first object and the second object were selected by the first swipe gesture; and
the order in which the first object and the second object were selected by the first swipe gesture determines:
which of the first object and the second object is identified as the subject of the caption, and
which of the first object and the second object is identified as the predicate of the caption; and
wherein the word choice includes a linking verb that indicates which of the first object and the second object acted upon the other and how one of the first object and the second object acted upon the other.

2. The apparatus of claim 1, wherein the electronic processor is further configured to:
detect the first object and the second object by performing object recognition to recognize particular objects based on an incident type or a Computer Aided Dispatch (CAD) identifier;
retrieve an incident report based on the CAD identifier;
generate an initial caption for the image based on a content of the incident report; and
replace the initial caption with the caption.

3. The apparatus of claim 1, wherein the electronic processor is further configured to:

receive, from the display, a second swipe gesture;

responsive to receiving the second swipe gesture, determine a second direction of the second swipe gesture relative to the first object and the second object; and determine the word choice based on the first direction and the second direction.

4. The apparatus of claim 3, wherein the electronic processor is further configured to:

determine an event sequence for the image based on the first swipe gesture and the second swipe gesture; and generate the caption for the image based on the event sequence.

5. The apparatus of claim 4, wherein the event sequence indicates:

which of the first object and the second object performed a first action, and which of the first object and the second object performed a second action.

6. The apparatus of claim 4, wherein the electronic processor is further configured to:

generate the caption describing the image by:

determining a context for the image based on the first swipe gesture, the second swipe gesture, the first direction, the second direction, the event sequence, and image analytics of the image; and providing the context to a caption generation engine.

7. The apparatus of claim 3, wherein the electronic processor is further configured to:

detect the first object and the second object by performing object recognition to recognize particular objects based on an incident type or a Computer Aided Dispatch (CAD) identifier;

retrieve an incident report based on the CAD identifier;

assign one of the first object and the second object to a subject and assign the other of the first object and the second object to a predicate based on the first direction and the second direction; and determine a verb relating the subject to the predicate based on a content of the incident report.

8. The apparatus of claim 1, further comprising:

a camera;

wherein the electronic processor is further configured to:

receive the image from the camera.

9. A method for automatically captioning images using swipe gestures as inputs, the method comprising:

receiving an image;

displaying the image on a display;

detecting a first object in the image;

detecting a second object in the image;

receiving a first swipe gesture;

responsive to receiving the first swipe gesture, determining a first direction of the first swipe gesture relative to the first object and the second object;

determining a word choice based on the first direction; and generating, with an electronic processor, a caption describing the image based on the word choice;

wherein:

the first direction of the first swipe gesture indicates an order in which the first object and the second object were selected by the first swipe gesture; and the order in which the first object and the second object were selected by the first swipe gesture determines:

which of the first object and the second object is identified as the subject of the caption, and which of the first object and the second object is identified as the predicate of the caption; and wherein the word choice includes a linking verb that indicates which of the first object and the second object acted upon the other and how one of the first object and the second object acted upon the other.

10. The method of claim 9, further comprising:

detecting the first object and the second object by performing object recognition to recognize particular objects based on an incident type or a Computer Aided Dispatch (CAD) identifier;

retrieving an incident report based on the CAD identifier;

generating, with the electronic processor, an initial caption for the image based on a content of the incident report; and replacing the initial caption with the caption.

11. The method of claim 9, further comprising:

receiving a second swipe gesture;

responsive to receiving the second swipe gesture, determining a second direction of the second swipe gesture relative to the first object and the second object; and determining the word choice based on the first direction and the second direction.

12. The method of claim 11, further comprising:

determining an event sequence for the image based on the first swipe gesture and the second swipe gesture; and generating, with the electronic processor, the caption for the image based on the event sequence.

13. The method of claim 12, wherein the event sequence indicates:

which of the first object and the second object performed a first action, and which of the first object and the second object performed a second action.

14. The method of claim 12, wherein generating the caption describing the image includes:

determining a context for the image based on the first swipe gesture, the second swipe gesture, the first direction, the second direction, the event sequence, and image analytics of the image; and providing the context to a caption generation engine.

15. The method of claim 11, further comprising:

detecting the first object and the second object by performing object recognition to recognize particular objects based on an incident type or a Computer Aided Dispatch (CAD) identifier;

retrieving an incident report based on the CAD identifier;

assigning one of the first object and the second object to a subject and assigning the other of the first object and the second object to a predicate based on the first direction and the second direction; and determining a verb relating the subject to the predicate based on a content of the incident report.

16. The method of claim 9, wherein receiving the image includes:

receiving the image from a camera of a portable electronic device including the electronic processor.

* * * * *